United States Patent [19]

Hagnere et al.

[11] Patent Number: 5,333,713
[45] Date of Patent: Aug. 2, 1994

[54] FRICTION CLUTCH

[75] Inventors: Raymon Hagnere; Pierre Warnke, both of Amiens, France

[73] Assignee: Valeo, Saint-Ouen Cedex, France

[21] Appl. No.: 109,523

[22] Filed: Aug. 20, 1993

[30] Foreign Application Priority Data

Aug. 21, 1992 [FR] France .................. 92 10194

[51] Int. Cl.$^5$ .............................. F16D 13/44
[52] U.S. Cl. ..................... 192/89.22; 192/70.27;
192/89.23; 192/89.24
[58] Field of Search ......... 192/89 BL, 89 PH, 89 PL,
192/89 SD, 70.27

[56] References Cited

U.S. PATENT DOCUMENTS

| | | | |
|---|---|---|---|
| 2,277,221 | 3/1942 | Gamble | 192/89 BL X |
| 2,952,453 | 9/1960 | Haussermann | 192/89 PH X |
| 3,185,274 | 5/1965 | Maurice | 192/89 PH X |
| 3,499,512 | 3/1970 | Maurice | 192/89 PH |
| 3,773,155 | 11/1973 | Fujita et al. | 192/89 BL X |
| 3,785,466 | 1/1974 | Marai et al. | 192/89 PH |
| 4,095,683 | 6/1978 | Ban | 192/89 PH X |
| 4,114,742 | 9/1978 | Rawlings | 192/89 PH |
| 4,629,048 | 11/1986 | Draper et al. | 192/70.27 |
| 4,662,497 | 5/1987 | Cucinotta et al. | 192/89 BL X |
| 4,720,002 | 1/1988 | Kitano et al. | 192/89 BL X |
| 4,744,448 | 5/1988 | Maycock et al. | 192/70.27 |
| 4,751,991 | 6/1988 | Naudin | 192/89 B |
| 4,754,860 | 7/1988 | Fukutake et al. | 192/70.27 X |
| 4,811,474 | 3/1989 | Maucher et al. | 192/89 BL X |
| 4,828,092 | 5/1989 | Kohler | 192/89 PH X |
| 4,895,235 | 1/1990 | Nishimura et al. | 192/89 BL X |
| 4,940,126 | 7/1990 | Flotow et al. | 192/70.27 X |
| 4,946,017 | 7/1990 | Flotow | 192/89 BL X |
| 5,014,838 | 5/1991 | Suzuki | 192/89 PH |
| 5,082,098 | 1/1992 | Gay et al. | 192/89 PL |
| 5,129,498 | 7/1992 | Gay et al. | 192/89 BL X |

FOREIGN PATENT DOCUMENTS

| | | |
|---|---|---|
| 3321822 | 12/1984 | Fed. Rep. of Germany . |
| 2563877 | 11/1985 | France . |
| 2585424 | 1/1987 | France . |
| 2606476 | 5/1988 | France . |
| 689432 | 3/1953 | United Kingdom . |
| 1040240 | 8/1966 | United Kingdom . |
| 1228138 | 4/1971 | United Kingdom . |
| 2158183 | 11/1983 | United Kingdom . |

Primary Examiner—Leslie A. Braun
Assistant Examiner—Andrea Pitts
Attorney, Agent, or Firm—Longacre & White

[57] ABSTRACT

A friction clutch for a motor vehicle comprises a cover plate and a pressure plate, with an elastic diaphragm between them. The peripheral portion of the diaphragm is at least partly enveloped by a sheath having two annular flanks which lie against the respective opposed surfaces of the peripheral portion. Each of these flanks has an annular projecting element, each of which has a convexity which cooperates with a corresponding surface portion of the pressure plate and cover plate respectively.

10 Claims, 3 Drawing Sheets

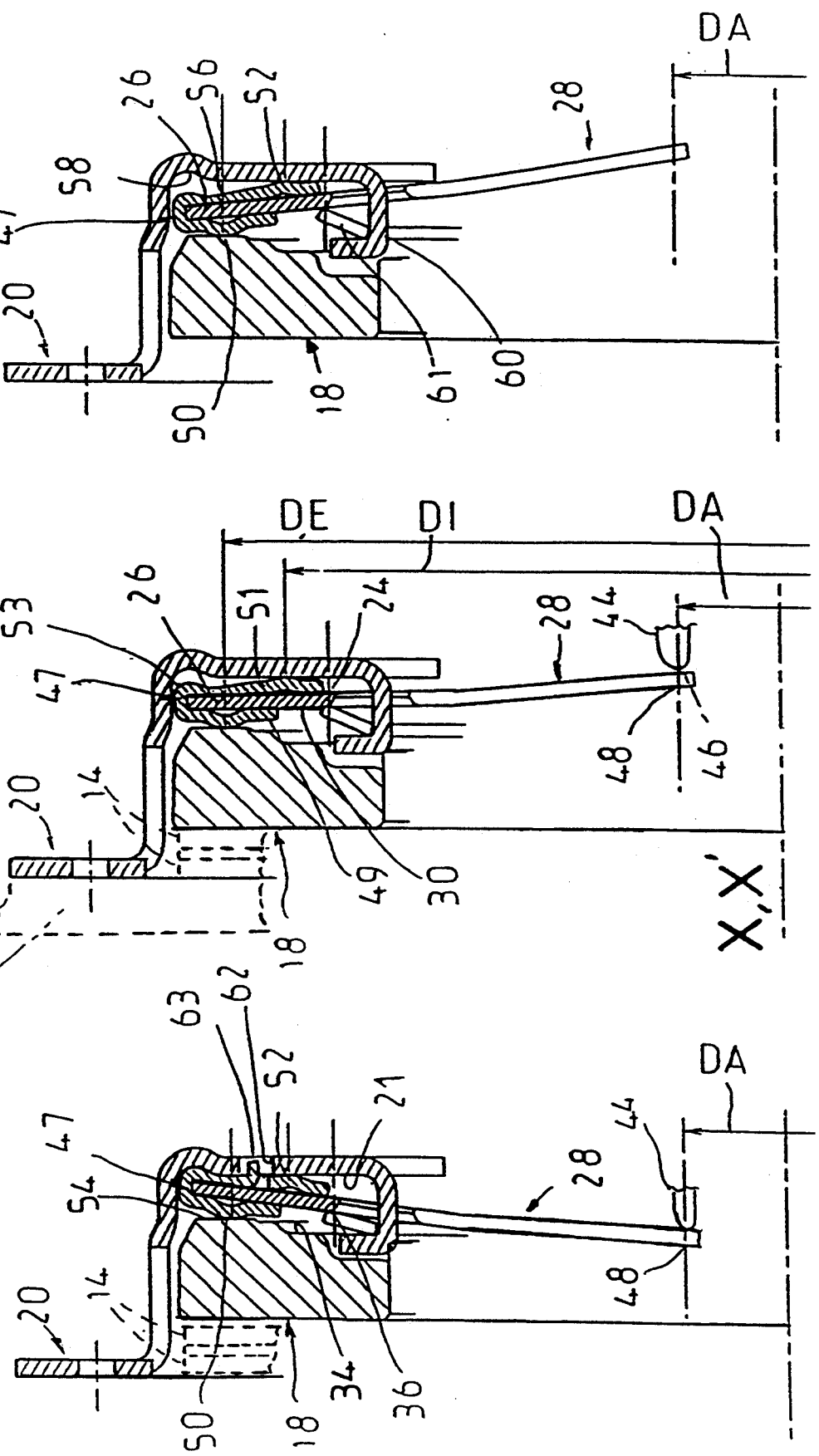

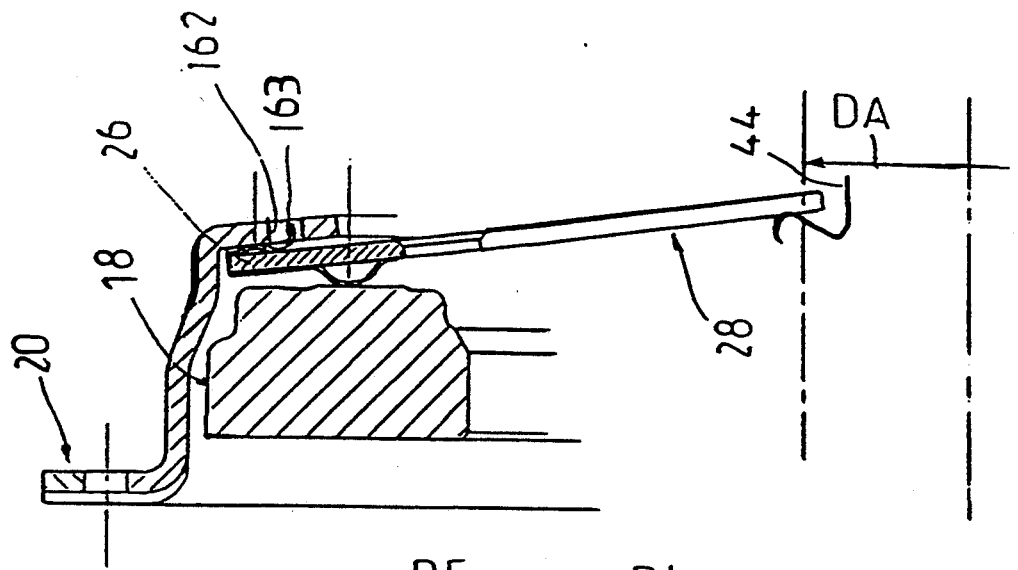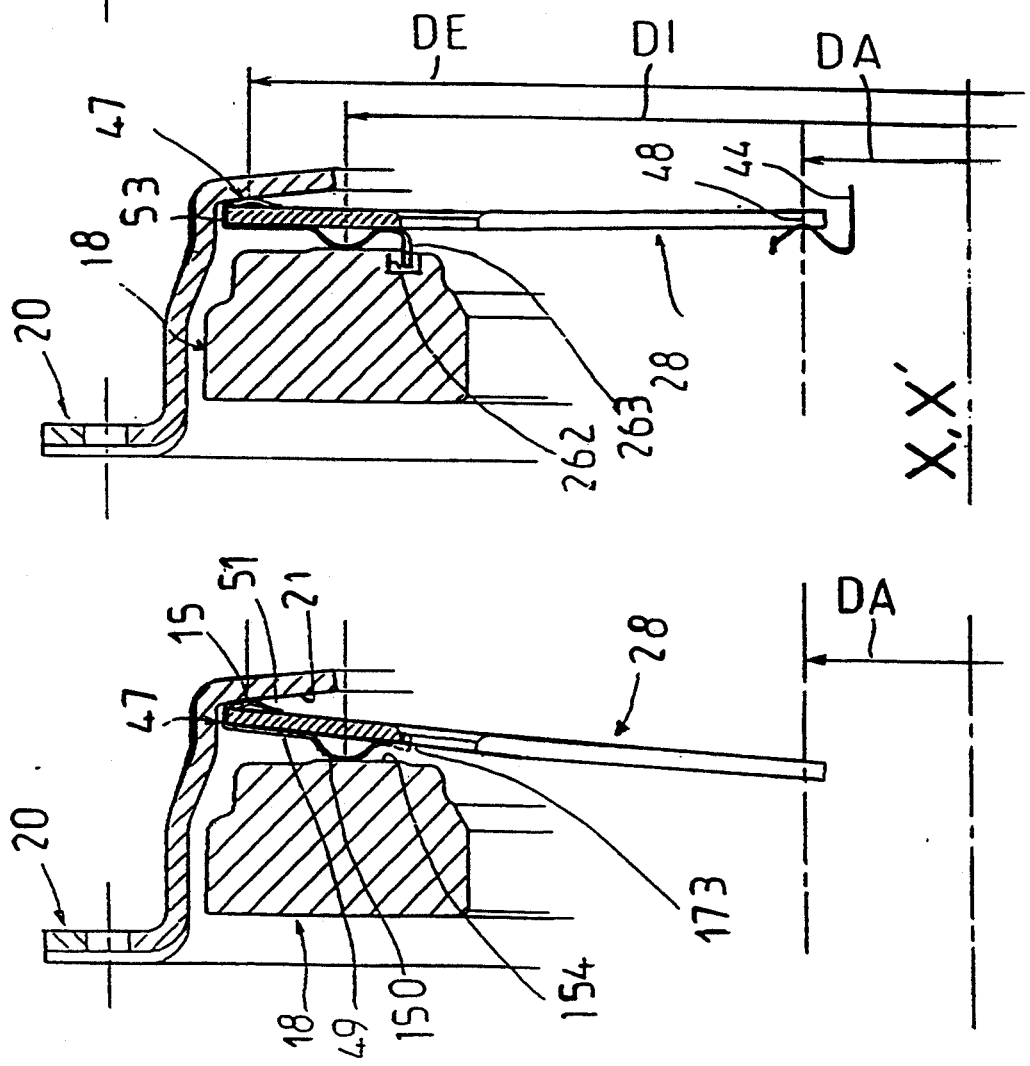

FRICTION CLUTCH

FIELD OF THE INVENTION

The present invention relates to a friction clutch, especially for a motor vehicle. More particularly, the invention is concerned with a friction clutch of the type comprising a cover plate and at least one pressure plate, with an elastic diaphragm arranged between them, the said diaphragm being frusto-conical in the free state and comprising an outer peripheral portion of substantially annular shape defining a Belleville ring, the inner edge of which is extended radially by a series of elastic fingers having free ends, which are separated from each other by slots and which cooperate with a clutch manoeuvring member. The latter (typically a clutch release bearing) is conventionally displaceable along or parallel to the axis of the clutch.

In the type of clutch in question, the two opposed faces of the annular peripheral portion of the diaphragm cooperate respectively with an engagement thrust element defined on the pressure plate in facing relationship with the diaphragm, and with another engagement or thrust element which is defined on the internal face of the cover plate, again in facing relationship with the diaphragm.

The clutch also has a clutch disc carrying friction liners which are, by virtue of the action of the diaphragm, gripped between the pressure plate and the flywheel (or reaction plate) of the clutch.

BACKGROUND OF THE INVENTION

When the driver of the vehicle pushes the clutch pedal down (in a vehicle having a clutch of the type described above) the pedal actuates a clutch fork or declutching fork which applies the clutch release bearing to the free ends of the diaphragm fingers. This causes the diaphragm to tilt, so that it no longer exerts any force on the pressure plate. In consequence, the pressure plate, which is usually biased by means of return tongues, releases the clutch disc so that the latter is no longer coupled in rotation to the engine flywheel. The gearbox is therefore uncoupled from the engine.

In one known design, the outer peripheral portion of the diaphragm is frusto-conical in its free state, and is formed from sheet metal having a substantially constant thickness. It then cooperates firstly with an annular land formed on the face of the pressure plate in facing relationship with it, and secondly with another annular land which is formed in facing relationship with it on the internal face of the cover plate.

Using a conventional elastic diaphragm according to that design, the resilient force which is exerted axially by the diaphragm on the pressure plate depends essentially on the thickness of the metal from which the diaphragm is formed, and on the dimensions of the outer peripheral portion of the latter, which are determined by the angle of the frustum of a cone defined by the diaphragm.

As the travel of the clutch release bearing (or course of deformation of the diaphragm fingers) progresses, the resilient force passes through a maximum which can be quite pronounced, before again decreasing. The ratio of the depth (measured axially) of the peripheral portion of the diaphragm to the thickness of the diaphragm determines the shape of this characteristic curve of the diaphragm.

It is possible to reduce the height of the summit or peak of the characteristic curve giving the value of the elastic force as a function of the degree of deformation of the diaphragm, in particular by increasing the thickness of the metal in the diaphragm. However, the reliability and fatigue resistance of such a type of diaphragm, when made of thick metal, are then both reduced. In addition, a very thick diaphragm is difficult to manufacture by press forming, and this also increases the total weight of the clutch.

Another disadvantage of clutches of conventional design lies in the fact that the pressure plate and cover plate have to be made with axially projecting annular lands, which increases the complexity of their design and also their manufacturing costs.

It has previously been proposed, in United Kingdom patent specification GB 2 158 183A and the corresponding French published patent specification FR 2 563 877A, to reduce the maximum height of the characteristic curve of the diaphragm by making the latter in the form of an annular resilient diaphragm, having a body in the form of a disc. In its unstressed state, this disc has a substantially frusto-conical shape, and comprises a body of revolution defining at least one annular profiled portion which is centred on the axis of the cone, and which has a concavity directed towards the exterior of the frustum of a cone. However, this is not an entirely satisfactory solution, firstly because any interference between the profiled portion of the pressure plate must be avoided, and secondly because it is still necessary to provide an annular land projecting axially on the internal face of the cover plate, together with another land on the pressure plate.

DISCUSSION OF THE INVENTION

In order to overcome the above mentioned disadvantages, the invention proposes a friction clutch comprising a cover plate and a pressure plate, with an elastic diaphragm arranged between them, the said diaphragm comprising a peripheral portion of substantially annular shape in the form of a Belleville ring, the inner edge of which is extended radially by a series of elastic fingers having free ends which cooperate with a clutch manoeuvring member, which is displaceable parallel to the axis of the clutch, in which the two opposed faces of the annular peripheral portion of the diaphragm cooperate, respectively, with an engagement element defined on the pressure plate in facing relationship with the diaphragm, and with an engagement element defined on the internal face of the cover plate in facing relationship with the diaphragm, is characterised in that it further includes a sheath which at least partly envelops the annular peripheral portion of the diaphragm, and which has two annular flanks which lie against the respective opposed surfaces of the annular peripheral portion of the diaphragm, with each said flank including an annular projecting element, which projects axially and defines a convexity oriented axially towards a corresponding surface portion, the said surface portions being defined, respectively, on the pressure plate and by the internal face of the cover plate, in facing relationship with the corresponding said flank of the sheath.

Thus, the diaphragm is not modified, and it is not subject to embedding and wear effects, because it is now the sheath that is in contact with the cover plate and the pressure plate.

According to a preferred feature of the invention, each said surface portion is a smooth annular surface portion.

According to another preferred feature of the invention, the sheath further includes a cylindrical crown portion which joins the two annular flanks together, and which surrounds the outer radial edge of the annular peripheral portion of the diaphragm. Preferably, in a clutch having that feature, the sheath has, in cross section through an axial plane, a profile which is substantially in the form of a letter U.

The two said annular projecting elements are preferably offset radially from each other.

According to yet another preferred feature of the invention, where the clutch is of the "push-to-release", or "push-off", type in which the clutch control or manoeuvring member is displaceable towards the pressure plate so as to disengage the clutch, the said convexity of that one of the said annular projecting elements which lies radially outward of the other cooperates with the said surface portion disposed, in facing relationship therewith, on the pressure plate.

The equivalent preferred feature of the invention in the case in which the clutch is of the "pull-to-release", or "pull-off", type in which the clutch manoeuvring or control member is displaceable axially towards the internal face of the cover plate so as to disengage the clutch, is that the said convexity of that one of the said annular projecting elements which lies radially inward of the other cooperates with the said surface portion disposed, in facing relationship therewith, on the internal face of the cover plate.

Preferably, one of the said flanks of the sheath includes at least one lug, which extends axially and which is received in a corresponding aperture formed in the pressure plate or in the internal face of the cover plate, in such a way as to immobilise the sheath and the diaphragm against rotation with respect to each other.

The annular peripheral portion of the diaphragm is preferably flat.

Preferably the sheath is made of sheet metal having a substantially constant thickness.

Also included within the scope of the present invention is a resilient diaphragm equipped with a sheath, for a clutch in accordance with the invention.

The invention enables both the cover plate and the pressure plate to be simplified, as well as reducing the incidence of wear in both these components, because use is now made of plain surface portions of both components for engagement with the diaphragm. Furthermore, the peak of the characteristic curve of the diaphragm is reduced in height.

Other advantages and features of the invention will appear more clearly on the reading of the description which follows, of preferred embodiments of the invention. This description is given by way of non-limiting example only, and with reference to the accompanying drawings.

BRIEF DESCRIPTION OF THE DRAWINGS

FIG. 3 is a view in axial cross section on a larger scale, showing a detail of FIG. 1 and illustrating a first embodiment of the invention as applied to a clutch of the push-off (or push-to-release) type, the mechanism being shown in the position in which the clutch, having new friction liners, is in the engaged position.

FIG. 4 is a view similar to that in FIG. 3, but shows the clutch in its disengaged position.

FIG. 5 is a view similar to FIG. 3, again showing the clutch in its engaged position, but with the friction liners of the clutch being worn down to their maximum permitted extent.

FIGS. 6 to 8 are views similar to FIGS. 3 to 5 respectively, but show a second embodiment in which the clutch is of the pull-off (or pull-to-release) type.

DESCRIPTION OF PREFERRED EMBODIMENTS OF THE INVENTION

Figure 1:
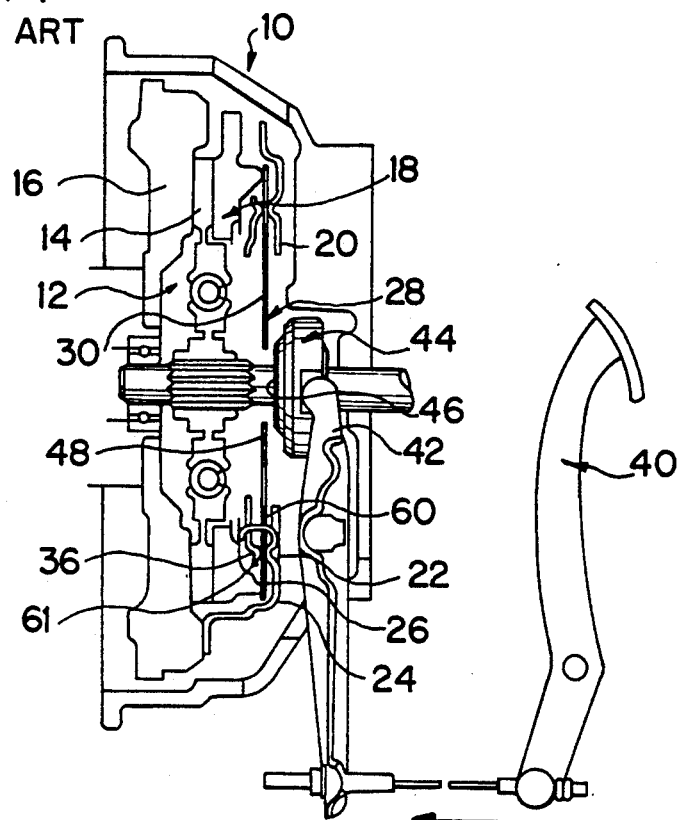
FIG. 1 is a view in axial cross section of a diaphragm-type friction clutch in accordance with the current state of the art.

The clutch 10 shown in FIG. 1 comprises a clutch disc 12, carrying friction liners 14 which are received between the parallel and opposed flat faces of an engine flywheel 16 on the one hand, and a pressure plate 18 on the other. The flywheel 16 and pressure plate 18 are carried on, and rotatable with, the crankshaft of the engine of the motor vehicle. The clutch 10 also includes a hollow cover plate 20 of annular shape, having a base portion which includes an annular land 22 which projects axially towards the interior, and which cooperates with a first lateral face 24 of the outer, annular, peripheral portion 26, in the form of a Belleville ring, of an elastic diaphragm 28.

The peripheral portion 26 of the diaphragm has a second lateral face 30 axially opposed to its face 24. This second lateral face 30 cooperates firstly with an annular land or bead 32, which projects axially from a lateral face 34 (see FIGS. 3 and 8) of the pressure plate 18; and secondly, with another annular land 36 which is formed on a crown ring 61.

This crown ring 61 is carried by retaining fingers 60, by which it is located axially. The retaining fingers 60 project from the cover plate 20, being formed by a pressing operation followed by bending. Each finger 60 comprises an axial portion, passing through the diaphragm 28 via holes which are formed in the latter close to the root of the radial fingers which constitute the inner portion of the diaphragm, surrounded by the Belleville ring portion 26. These holes in the diaphragm constitute the widened blind ends of the slots which separate the diaphragm fingers from each other. The free end of the axial portion of each retaining finger 60 is bent back radially in a direction away from the axis of the assembly, so as to form a bend in which the crown ring 61 is axially located. For more detail, reference is invited to the specification of U.S. Pat. No. 4,751,991 and the corresponding French published patent specification FR 2 585 424A. The disclosure of the United States document is to be considered as being incorporated in the present description.

The lands 22 and 36, arranged in facing relationship to each other, define respective summits which form the primary and secondary fulcrums, respectively, for the articulation of the diaphragm 28, whereby the latter is mounted in a pivoting or tilting manner between these fulcrums 22 and 36.

Control of the clutch 10 is provided by means of a clutch pedal 40 which is coupled to a clutch fork 42 acting on a clutch release bearing 44, the nose 46 of which is arranged to cooperate with the free radially inner ends 48 of the resilient fingers of the diaphragm 28. The clutch release bearing 44 is the manoeuvring member for the clutch, and is displaced, in operation, parallel to the axis of the assembly. It is typically mounted on a guide tube which is fixed to the gearbox.

The clutch shown in FIG. 1 is of the push-off type, i.e. the type in which an axial thrust is exerted by the clutch release bearing on the diaphragm fingers so as to release the clutdch. Control of the declutching operation, i.e. of disengagement of the clutch, is effected by causing the clutch release bearing 44 to be displaced axially along its guide tube towards the pressure plate 18. Normally, the diaphragm 28 urges the pressure plate 18 towards the flywheel 16, and the friction liners 14 on the clutch disc 12 are gripped between the pressure plate 18 and the flywheel 16. In this condition the clutch is engaged, the driving torque being transmitted from the engine crankshaft to the input shaft of the gearbox via the friction liners 14 and the clutch disc 12, the latter being secured to the gearbox input shaft for rotation of the latter with it, typically by means of a splined coupling.

As the friction liners 14 become worn, the deflection or inclination of the diaphragm 28 changes, the diaphragm being generally flat when the liners 14 are new, and when the clutch is engaged.

The axial displacement of the clutch release bearing 44 thus causes the diaphragm to deflect or deform between its fulcrums 22 and 36, causing lifting of the pressure plate 18, which thereby becomes displaced towards the cover plate 20 under the action of a set of tangential tongues (not shown). In a known manner, these tongues couple the pressure plate 18 with the cover plate 20 for rotation together, while permitting the axial displacement of the pressure plate 18 with respect to the cover plate 20. The displacement of the pressure plate 18 releases the friction liners 14, so that the clutch is then disengaged and the drive to the gearbox input shaft from the engine of the vehicle is thereby interrupted.

Figure 2:
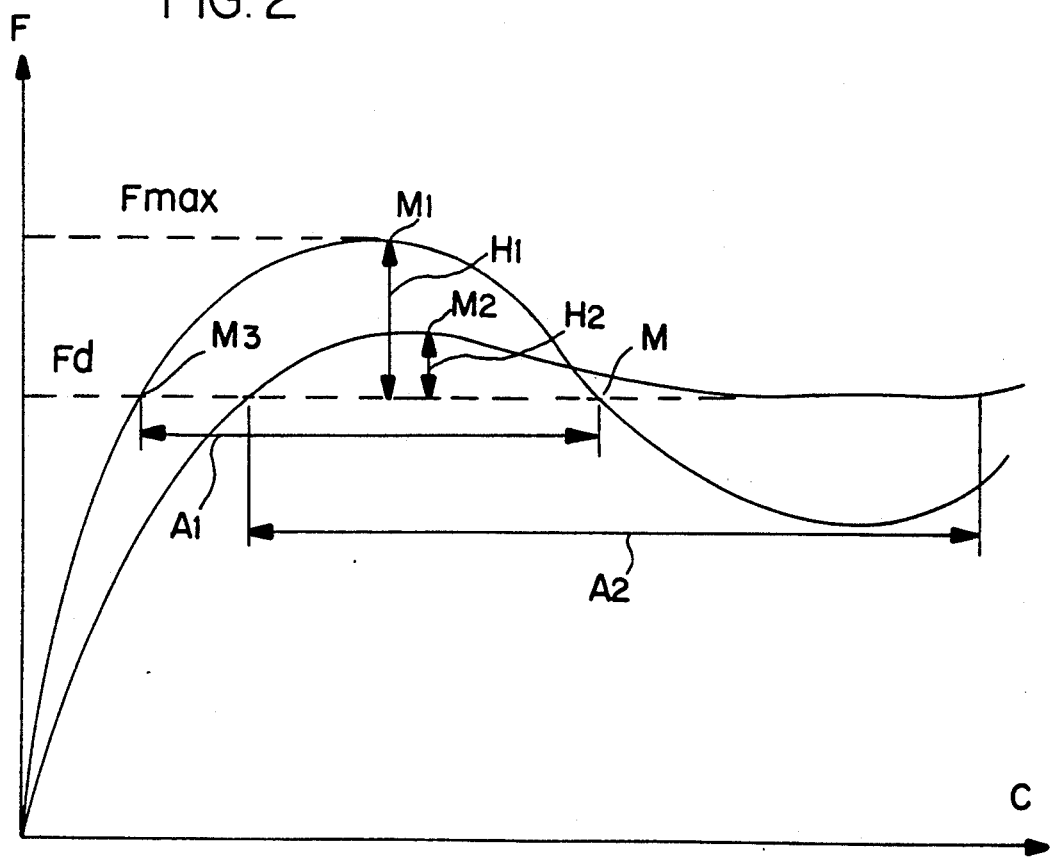
FIG. 2 is a graph giving curves which illustrate the elastic force of the diaphragm as a function of the axial travel of the clutch release bearing.

Referring now to FIG. 2, in which diaphragm force F is plotted against the axial travel C of the clutch release bearing 44, the curve C1 shows the value of the force F in relation to the clutch release bearing travel C. As can be seen, this curve, starting from the position M in which the clutch is engaged, and which varies according to the amount of wear that has taken place in the friction liners 14, increases at first and passes through a maximum $M_1$ when the value of F is Fmax. It then decreases rapidly and falls below the value $M_3$, where the diaphragm force Fd corresponds to the position in which the clutch is engaged when the friction liners 14 are worn.

Also shown in FIG. 2 are a height $H_1$, which is equal to Fmax—Fd, and the length $A_1$ of the travel of the clutch release bearing between the points M and $M_3$, over which the force F first increases and decreases.

The embodiments of the invention which will now be described with reference to FIGS. 3 to 8 aim, in particular, to reduce the value of the height $H_1$, and to increase the length of the effective course of travel of the clutch release bearing, i.e. the effective deflection of the diaphragm, which can be used for control of the clutch.

In the embodiment shown in FIGS. 3 to 5, in which the clutch is of the "push-to-release" type, the annular peripheral portion 26 of the diaphragm 28 is an annular portion in the form of a Belleville ring which extends, as constructed, in a plane which is substantially at right angles to the axis X—X' of the clutch assembly when the friction liners are new (see FIG. 3), and which becomes inclined as the liners 14 become worn (as shown in FIG. 5).

The annular peripheral portion 26 is enveloped by a sheath 47 which is made by blanking, press-forming and bending of a metal sheet having a substantially constant thickness. The sheath 47 includes two parallel side flanks 49 and 51, each of which extends on a respective one of the two axially opposed side faces 30 and 24 of the annular peripheral portion 26. The two side flanks 49 and 51 are joined together through an external cylindrical crown portion 53 which surrounds the outer radial edge of the annular peripheral portion 26.

Thus, as can easily be seen from FIG. 3, the sheath 47 has a cross section in an annular plane which is substantially in the form of a letter U. It is force-fitted on the diaphragm, and in this example the sheath 47 is not heat treated.

The first flank 47 of the sheath includes a first annular projecting element 50, which projects axially from the second lateral face 30 of the annular peripheral portion 26 of the diaphragm, such that its convexity cooperates with an annular, flat surface portion 54 which is formed in the inner face 34 of the pressure plate 18.

The second side flank 51 is formed with a second annular projecting element 52 which projects axially from the first lateral face 24 of the annular peripheral portion 26 of the diaphragm, in the opposite direction to the first annular projecting element 50. The convexity of the element 52 cooperates with the internal face 21 of the base portion of the cover plate 20, which in this example is a flat annular surface portion extending in a plane substantially at right angles to the axis X—X. The projecting elements 50 and 52 have rounded summits, so as not to exert concentrated forces.

The design which has been described above with reference to FIG. 3 enables the characteristic curve C2, shown in FIG. 2, to be obtained. From this it can be seen that the height $H_2$ is generally reduced as compared with the height $H_1$. It can also be seen from FIG. 2 that the usable course of travel $A_2$ is larger overall than in the case of a clutch in the prior art which has the characteristic curve C1. The height $H_2$ is beneficial to the comfort of the driver of the vehicle.

Reverting to FIG. 3, it can be seen that the pressure plate 18 is a component having a particularly simple form of construction, to the extent that it no longer includes the annular land 32 shown in FIG. 1 and projecting axially from the lateral face 34 of the pressure plate. Instead, engagement with the diaphragm is obtained from a surface portion of the lateral face 34 itself, this surface portion being flat in this example. Similarly, the internal face 21 of the cover plate 20 is also flat, while the primary fulcrum of the diaphragm is constituted by a surface portion of the cover plate 20, which cooperates directly with the second rib 52 formed in the annular peripheral portion 26 of the diaphragm 28. This arrangement not only simplifies the machining operations on the pressure plate 18 and cover plate 20, but also simplifies the tools that need to be used. It is not necessary to observe great accuracy in making these two components 18 and 20, so far as their surfaces for engagement with the diaphragm 28 are concerned.

In FIGS. 3 to 5, the crown ring 61 is of the same kind as that which is described in the above mentioned U.S. Pat. No. 4,751,991 and its corresponding French published patent specification FR 2 585 424A. Accordingly, it is of frusto-conical shape, and is fitted radially inwardly of the second or inner rib 52. The zone of the internal face 21 of the cover plate 20 defines a primary engagement surface for the diaphragm, and is disposed on a mean circumference defining a diameter which is greater than that of the secondary fulcrum 36 defined by the crown ring 61. This simplifies the manufacture of the cover plate 20 and fingers 60. It will be noted that there is an axially projecting rounded portion 58, which joins the base portion of the cover plate 20 (having the internal face 21) to the axially oriented annular skirt portion of the cover plate 20. As will have been noticed, the latter is generally in the form of a hollow dish having a central opening in its base portion. The above mentioned rounded portion 58 prevents any contact occurring between the sheath 47 of the diaphragm 28 and the base portion of the cover plate 20, and also increases the rigidity of the latter. It is because the cover plate does not here have to be formed with a bead for engagement with the diaphragm, that this is made possible.

In the case of a clutch of the "push-to-release" type, such as that which is shown in FIGS. 3 to 5, the first annular projecting element 50 lies radially outward of the other projecting element 52, and cooperates with the pressure plate 18; and the projecting element 52 (i.e. the one which is radially inward of the other) cooperates with the internal face 21 of the cover plate, which serves as a primary thrust surface for the diaphragm as it deflects.

The construction of a diaphragm 28 incorporating the features of the invention, and in particular having the sheath 47, also leads to an additional advantage. In this connection, this design enables the lever arm to be increased during actuation of the clutch at the end of its course of travel. This leads to an improved lift, that is to say an improved separation of the pressure plate 18 from the friction liners 14. This in turn results in greater regularity in the wear that takes place in the friction liners.

In this connection, this improved separation, for a given course of travel of the clutch release bearing, delays the occurrence of any contact, or brushing action, between the friction liners 14 and the pressure plate 18 when the clutch is disengaged. Any such contact does of course accelerate the wear in the friction liners 14. Another favourable result consists of a reduction in embedding and/or work hardening effects at the interfaces between the diaphragm and the cover plate and pressure plate, and the engagement surfaces of the cover plate and pressure plate are accessible for cleaning.

By way of example, if: the diameter DE (FIG. 3) of the outer rib 50 is substantially equal to 184 mm; the internal diameter DI of the second rib 52 is substantially equal to 164 mm; and the effective actuating diameter DA of the clutch release bearing 44 is substantially equal to 34 mm, then the lever arm is equal to 6.53 in the "clutch engaged" position when the friction liners 14 are new and the diaphragm is generally flat. This is the situation shown in FIG. 3. In the situation shown in FIG. 4 in which the clutch is disengaged and the friction liners are new, the value of the lever arm is 7.03. Similarly, in the situation shown in FIG. 5 where the clutch is engaged but the friction liners are taken to be worn to their maximum permitted extent, the value of the lever arm is 6.33.

Accordingly, it can be seen that the diaphragm proper is of a particularly simple form of construction, to the extent that firstly, it is blanked and press-formed in the conventional way in sheet metal of constant thickness, and is then enclosed by the sheath 47 which has previously been blanked and press-formed, and which is then bent on to the opposed side faces of the annular peripheral portion 26 of the diaphragm 28, so as to envelop the latter as shown in the drawings.

During the blanking operation for the sheath, in which, in particular, the annular ribs or projecting elements 50 and 52 are formed, it is also possible to form a hollow annular profiled portion 56 in the surface of the flank 51 which faces towards the inner face 21 of the cover plate 20, so as to facilitate the tilting movement of the diaphragm during the declutching operation. The profile of the hollow profiled portion 56 is complementary to the rounded portion indicated in FIG. 5 at 58, formed in the internal face of the cover plate 20 in facing relationship with the profiled portion 56.

Reference is now made to FIGS. 6 to 8, which show a clutch of the "pull-to-release" type in accordance with the present invention. In these Figures, the first and second annular projecting elements of the sheath are indicated at 150 and 152 respectively, while the flat surface portion of the pressure plate 18 is indicated at 154. The first projecting element 150, formed in the flank 49 of the sheath 47, lies radially inward of the other projecting element 152, and cooperates with the flat surface portion 154 of the pressure plate. The other projecting element, 152, which is formed on the side flank 51 of the sheath, lies radially outwardly and cooperates with a flat annular surface portion of the inner face 21 of the cover plate 20.

In this version, an increase in the lever arm in the declurched position is again found to take place.

By way of example, with typical (but non-limiting) values DE=205 mm, DI=177 mm and DA=48 mm, the value of the lever arm is equal to 5.73, 5.90 and 5.72 respectively in the positions shown in FIGS. 6 to 8 (i.e. with the clutch engaged and new liners; clutch disengaged and new liners; and clutch disengaged with liners worn to their maximum permitted extent, respectively).

As in FIGS. 3 to 5, the projecting elements 150 and 152 have rounded summits which do not exert concentrated forces. In this example the sheath 47 has a low thickness and is heat treated. It may be made of spring steel, in which case it is fitted by clipping it in position.

Finally, reference is once again made to FIG. 4, in which an additional improvement to the diaphragm 28 is indicated. In this connection, it is possible to form one or more lugs 63 in the sheath 47 by blanking and bending. These lugs extend axially into corresponding apertures or holes 62 which are formed for example in the cover plate 20, or symmetrically in the pressure plate 18, for the purpose of preventing rotation of the sheath 47 with respect to the cover plate 20 (and therefore with respect to the diaphragm 28). Thus the annular peripheral portion 26 of the diaphragm is held between the side flanks 49 and 51 of the sheath 47.

It will be noted that the lugs 63 in FIG. 4 enable the circumferential width of the retaining fingers 60 (FIGS. 1 and 5) to be reduced, because these latter no longer have to perform the function of preventing the diaphragm from rotating.

In the context of the clutch shown in FIGS. 6 to 8, this arrangement is easy to achieve, simply by making the sheath 27 longer. Thus in FIG. 6, the anti-rotation lugs (indicated by the reference numeral 263 in this Figure) constitute extensions of the flank 49 of the sheath, being bent back in an axial direction so that each lug 263 cooperates with a corresponding aperture 262 formed in the pressure plate 18.

FIG. 7 illustrates a modified version of this arrangement, in which it is the other flank, 51, of the sheath which is extended by anti-rotation lugs 163, again bent axially, with each lug 163 penetrating into an aperture 162 formed, this time, in the base of the cover plate 20.

These arrangements are of particular advantage in clutches of the pull-to-release type, in which there tends to be a somewhat crucial problem of rotation of the diaphragm.

It will be noted that in all of the embodiments described above, the surface portions which are formed on the pressure plate 18 and cover plate 20 respectively are smooth. The surface portion defined on the pressure plate is preferably flat in all cases, while the surface portion defined on the cover plate is either flat as in FIGS. 3 to 5, or of frusto-conical shape as in FIGS. 6 to 8.

It will be appreciated that it is even possible to use a standard pressure plate by increasing the surface 54 in FIG. 4.

Finally, in a further modification, the flank 49 of the sheath may be extended by means of axial lugs 173 (see FIG. 8), which, during the fitting operation by clipping in position, penetrate into the apertures in the diaphragm 28 so as to provide further means for retaining the sheath 47. The same is true in FIGS. 3 to 5, but in this case it is necessary to bend these lugs during force-fitting.

What is claimed is:

1. A friction clutch comprising: a cover plate; a pressure plate; and a resilient diaphragm between the said cover plate and pressure plate, the said diaphragm comprising an outer peripheral portion of substantially annular shape, defining a Belleville ring, and a series of resilient fingers extending radially inwardly from the said outer peripheral portion, the said fingers having free ends, the cover plate, pressure plate and diaphragm together defining an axis of the clutch, the said free ends of the diaphragm fingers being arranged for cooperation with a clutch manoeuvring member displaceable parallel to the said clutch axis, the said outer annular peripheral portion of the diaphragm having two opposed thrust faces, the pressure plate defining a first engagement element in facing relationship with the diaphragm for cooperation with one said thrust face, and the cover plate having an internal face defining a second engagement element in facing relationship with the diaphragm for cooperation with the other said thrust face, wherein the clutch further includes a sheath at least partly enveloping the said outer annular peripheral portion of the diaphragm, the sheath having two annular flanks positioned against the respective opposed thrust faces of the diaphragm, each said flank defining an annular projecting element which projects axially and defines a convexity oriented axially towards a respective one of the said first and second engagement elements, these engagement element are surface portions defined respectively on the pressure plate and on the said internal face of the cover plate in facing relationship with the corresponding said projecting elements of the sheath.

2. A clutch according to claim 1, wherein each said surface portion is annular and smooth.

3. A clutch according to claim 1, wherein the sheath further includes a cylindrical crown portion joining its two annular flanks together and surrounding a radially outer edge of the annular peripheral portion of the diaphragm.

4. A clutch according to claim 3, wherein the sheath defines, in cross section through an axial plane, a profile which is substantially in a shape of a letter U.

5. A clutch according to claim 1, wherein the two said annular projecting elements are offset radially from each other.

6. A clutch according to claim 5, of a push-off type adapted to be disengaged by displacement of a said clutch manoeuvring member axially towards the pressure plate, wherein the said convexity of one of the said annular projecting elements which is positioned radially outward of the other one of said projecting elements is arranged in cooperating relationship with one of the said surface portions which is defined on the pressure plate.

7. A clutch according to claim 5, of a pull-off type adapted to be disengaged by displacement of a said clutch manoeuvring member axially towards the said internal face of the cover plate, wherein the said convexity of one of the said annular projecting elements which is positioned radially outwardly of the other one of the projecting elements is arranged in cooperating relationship with one of the said surface portions which is defined on the internal face of the cover plate.

8. A clutch according to claim 1, wherein one said flank of the sheath includes at least one lug extending axially, with an element selected from the pressure plate and the internal face of the cover plate being formed with at least one aperture corresponding to the said at least one lug and receiving the latter, whereby to immobilize the sheath and diaphragm against rotation with respect to each other.

9. A clutch according to claim 1, wherein the annular peripheral portion of the diaphragm is flat and of substantially constant thickness.

10. A clutch according to claim 1, wherein the sheath is made of sheet metal having a substantially constant thickness, with its said projecting elements defining rounded summits.

* * * * *